Nov. 1, 1966  C. A. AMANN ET AL  3,282,360
DIRIGIBLE AIR BEARING TRANSPORT DEVICE
Filed April 17, 1962  2 Sheets-Sheet 1

INVENTOR.
Charles A. Amann,
BY John S. Collman &
Jerrold W. Scheel
W. F. Wagner
ATTORNEY

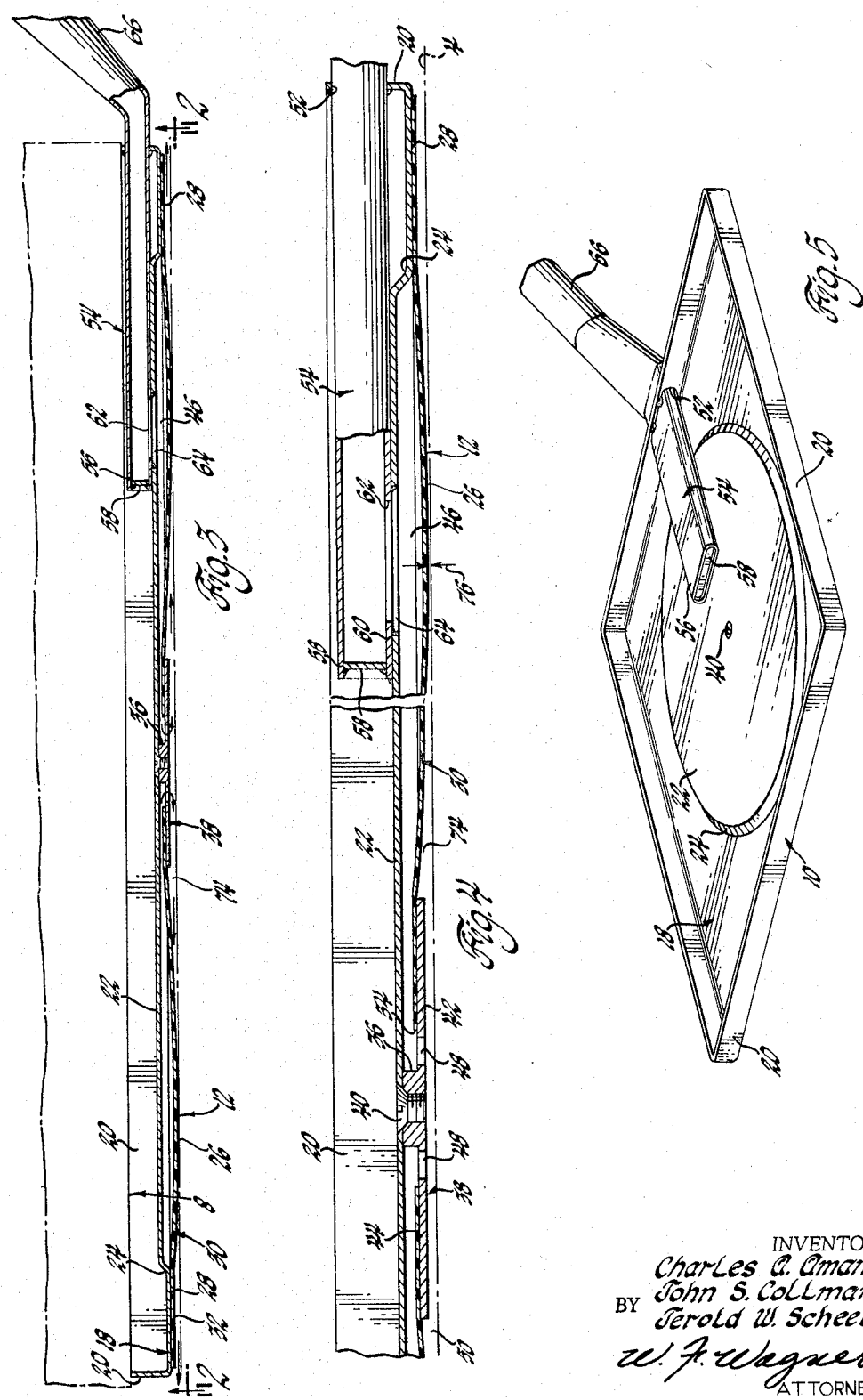

_United States Patent Office_

3,282,360
Patented Nov. 1, 1966

3,282,360
DIRIGIBLE AIR BEARING TRANSPORT DEVICE
Charles A. Amann, Birmingham, and John S. Collman and Jerold W. Scheel, Detroit, Mich., assignors to General Motors Corporation, Detroit, Mich., a corporation of Michigan
Filed Apr. 17, 1962, Ser. No. 188,179
5 Claims. (Cl. 180—7)

This invention relates to dirigible load carrying devices incorporating low pressure air bearing means capable of supporting a load in frictionless spaced relation proximate to a supporting surface.

The invention is concerned primarily, although not exclusively, with providing an efficient, economical and simply operated means for accomplishing easy mobility of bulky household appliances and the like. For purposes of definition, the device hereinafter described is termed an "air caster" in view of its similarity to the function of conventional casters, and to distinguish over various other forms of ground effect machines.

In general, home appliances, such as ranges, refrigerators, freezer cabinets, etc., while capable of movement from installed positions, are in fact rarely moved therefrom due to relatively great physical effort required. As a result, certain portions of such appliances and the adjacent household area are for practical purposes inaccessible for routine cleaning.

According to the present invention, a convenient manually operable transport device is formed in a manner allowing slidable disposition thereof between the lower surface of an appliance and the floor upon which it rests. The device comprises a tray-like supporting platform having flexible diaphragm type air bearing means mounted on the lower surface thereof adapted to be energized by low air pressure preferably supplied by a conventional household vacuum cleaner. The "air caster," when so energized, sequentially elevates the appliance relative to the floor and produces a plenum cavity of superatmospheric air between the device and the floor capable of supporting both the device and the appliance in substantially frictionless spaced relation to the floor, whereby the appliance may be moved by exerting slight manual effort. In practice, the device allows appliances of relatively great bulk and mass to be easily moved in and out of their normal installed position with physical effort well within the capabilities of an average woman or child.

According to another feature of the invention, the device is constructed and arranged so that positive directional and tilt stabilizing control may be exerted manually by the operator at all times during mobility of the appliance.

An object of the invention is to provide a device of the type described which is exceedingly simple in construction, low in cost, efficient in operation, and which requires only elemental manual skill in operation.

Another object is to provide a device of the type described which is especially adapted for use as an attachment for conventional household vacuum cleaning units commonly found in average homes.

A still further object is to provide a device of the type described wherein means are provided for coupling the same to the rigid tubular vacuum cleaner hose extension in a manner causing the lift device and tubular extension to act as a rigid unit, whereby manual pressure exerted on the tubular extension enables exercise of directional control and horizontal stabilizing on the device and load supported thereon.

These and other objects, advantages and features of the invention wil become more fully apparent as reference is had to the accompanying specification and drawings wherein:

FIGURE 3 is an enlarged sectional elevational view showing the details of construction of the support and associated air bearing;

FIGURE 4 is a further enlarged and fragmented view similar to FIGURE 3; and

FIGURE 5 is a perspective view of the device, further illustrating configuration details of the rigid platform portion thereof.

Figure 1:
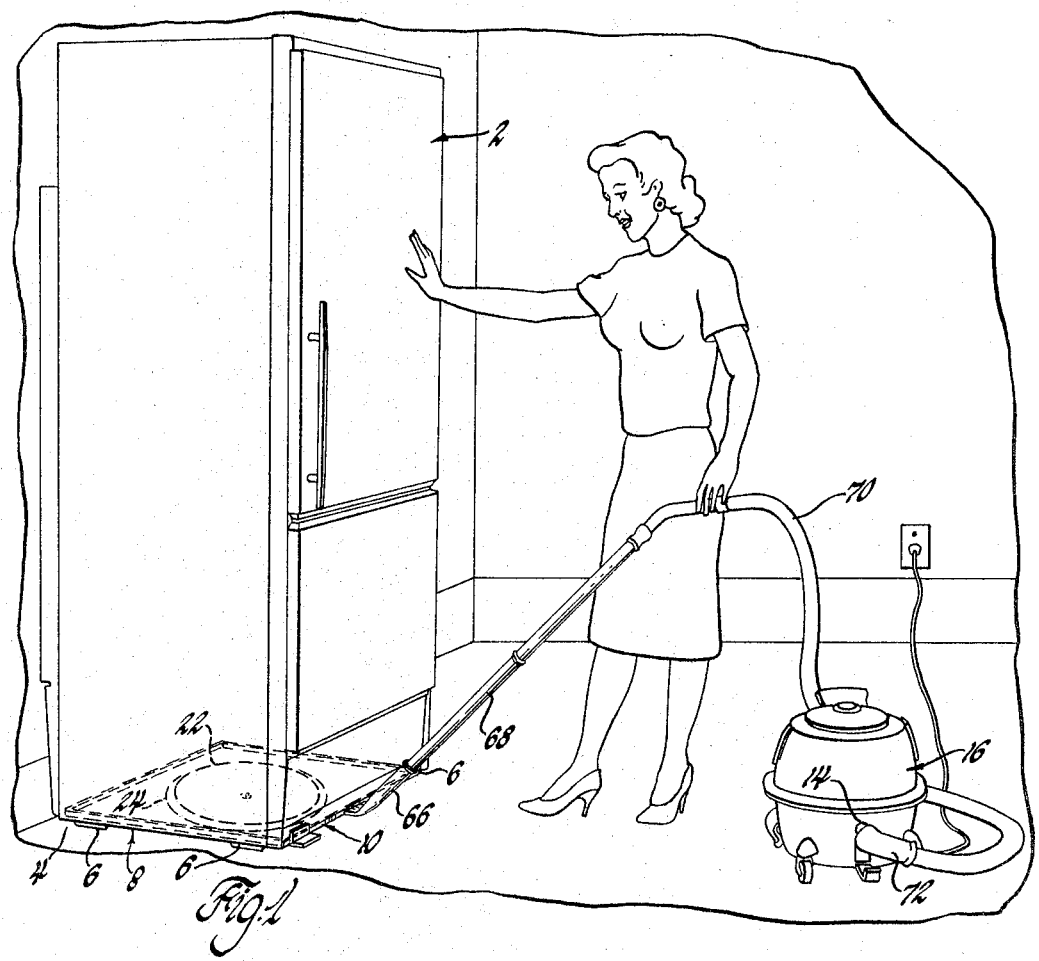
FIGURE 1 is a perspective view showing the invention in relation to a household refrigerator, wherein a conventional cannister type vacuum cleaner forms the source of power therefor.

Referring now to the drawings and particularly FIGURE 1, reference numeral 2 designates a conventional upright horizontal refrigerator-freezer unit. Unit 2 is normally supported above the floor 4 by short legs 6 at the four corners thereof which also serve to provide a clearance or air space between the floor and the lower extremity or surface 8 (FIGURE 3) of the appliance housing or box. According to the present invention, there is provided a shallow tray-like lifting and mobilizing device 10 which is adapted to be slidably inserted beneath the lower surface 8 of the refrigerator and the floor 4. Lifting device 10 includes a flexible plenum chamber type air bearing assembly 12, shortly to be described, which, when energized by connection with the pressure discharge or outlet 14 of a conventional household vacuum cleaner 16, elevates the unit 2 above the floor 4 sufficiently to provide a clearance between legs 6 and the floor 4. Virtually simultaneously, a superatmospheric air "pad" is established between the major portion of the device and the floor, which provides an air bearing operative to eliminate friction with the floor to the extent that the refrigerator may be moved by exerting minor physical effort.

Figure 2:
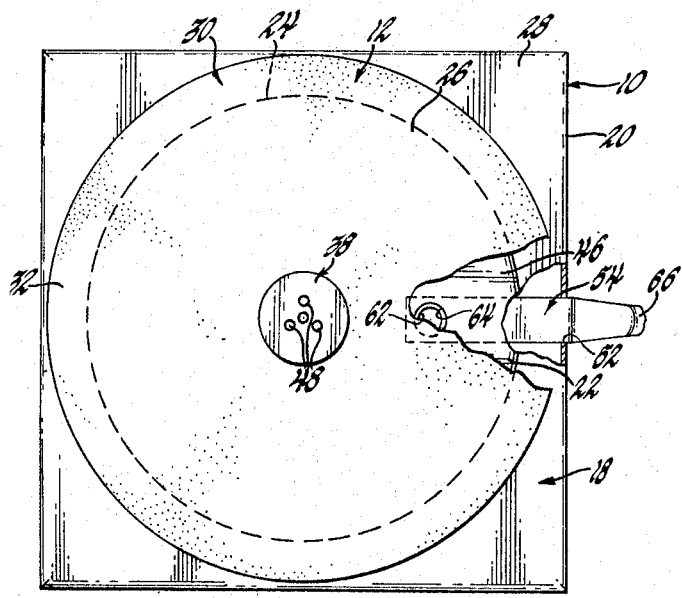
FIGURE 2 is a bottom plan view, partly in section and with parts broken away, illustrating the form and construction of the subject device.

As seen best in FIGURES 2, 3 and 5, lifting device 10 comprises a substantially flat relatively thin platform element 18 having a vertically upturned perimetrical flange 20 and a central upwardly dished circular portion 22. Flange 20 and dished portion 22 serve to impart structural rigidity to platform 10, while the circular portion 22 additionally defines the circular boundary 24 of the area 26 over which air bearing support is effected. As seen best in FIGURES 2 and 3, the lower surface 28 of platform 18 has disposed thereover a circular sheet or diaphragm 30 of flexible material, such as a commercial vinyl film, the diameter of which is approximately equal to the transverse or longitudinal dimension of platform 18. According to the invention, that portion 32 of the flexible material between the outer periphery thereof and the circular boundary 24 of area 26 is bonded or otherwise secured to the lower surface 28 of platform 18, as for example by epoxy cement. Centrally thereof, diaphragm 30 is formed with an aperture 34 through which extends the stud portion 36 of a circular plate-like element 38. Stud portion 36 is rigidly secured to the lower surface and centrally of dished portion 22 by machine screw 40. Stud 36 is dimensioned vertically so that the lower surface 42 of plate 38 is flush with the lower surface of diaphragm 30 in the area where the upper surface of the latter is bonded to lower surface 28 of plate 18. The lower surface of diaphragm 30 adjacent aperture 34 is in turn bonded to the upper surface 44 of plate 38 so that diaphragm 30 and plate 18 form an annular inflatable cavity 46. Immediately radially inwardly of aperture 34 in diaphragm 30, plate 38 is formed with a plurality of vertically directed openings 48 which provide communication between annular cavity 46 and the space 50 between diaphragm 30 and the floor.

Extending through an aperture 52 in flange 20 and rigidly secured thereto, as by welding, is an air inlet duct 54 of generally rectangular cross section. The inner extremity 56 of duct 54 extends inboard of platform 18 into overlying flush engagement with upwardly deformed portion 22 and is capped by an end closure 58. Slightly outboard of closure 58, the lower wall 60 of duct 54 is formed with an aperture 62 which registers with an aperture 64 formed in dished portion 22 so that the interior of the duct is in communication with annular cavity 46. At its outer end, duct 54 sweeps upwardly and outwardly to form an inclined tubular neck portion 66 of circular cross section, the diameter of which permits telescoping rigid engagement with a standard tubular extension "wand" 68 conventionally present at the free end of the length of flexible hose 70 utilized in cannister and tank type vacuum cleaners, such as shown at 16 in FIGURE 1.

In operating the device described, the end 72 of flexible hose 70 is disconnected from the suction connection and reconnected at the pressure or outlet connection 14 of cleaner 16. The tubular wand 68 is then telescopingly inserted into tubular neck 66 of lifting device 10 until rigid engagement is achieved. The operator then manually slides lifting device 10 beneath the refrigerator 2 using wand 68 as a handle. When lift device 10 is in the operating position shown in FIGURE 1, the vacuum cleaner 16 is switched on, causing superatmospheric air to be discharged therefrom and enter hose 70, wand 68 and duct 54, emerging through registered apertures 62 and 64 into cavity 46. Entrance of air in cavity 46 causes diaphragm 30 to bulge downwardly, as shown in FIGURE 3, and exert a lifting force elevating the appliance above the floor. As soon as maximum elevation within the inflation limits of the annular cavity have been achieved, continuing flow of air from vacuum cleaner 16 emerges from cavity 46 through apertures 48 in the plate 38 into the space 50 between diaphragm 30 and the floor 4, establishing a low pressure "pad" of air in the generally frusto-conical plenum cavity 74 formed between diaphragm 30 and floor 4. The effective diameter of the air "pad" is bounded by an imaginary circle defined by the lowermost extremity of downwardly bulged diaphragm 30, which extremity forms a throttling gap 76 limiting the rate of radial discharge of air from the cavity 74. In practice, it has been found that the indicated circular area over which the air bearing "pad" is effective is more than sufficient to elevate and support a typical household refrigerator when operating from discharge pressures well within the normal operational capability of any of a variety of well known household vacuum cleaners. While the area may obviously be increased by forming the diaphragm as a square sheet and cementing it along the straight side of platform 10, the circular configuration is desirable, since it eliminates unsymmetrical inflation stresses on the diaphragm which may, therefore, be cut from ordinary flat stock.

In appliances such as upright refrigerators having relatively small base area in relation to total bulk, stability when supported by air bearing means is of paramount importance. It will be evident that if the appliance exhibits a tendency to tilt or rock, one or more of legs 6 will ground out. In addition, such inclination, if significant, could spoil the air bearing effect. However, a device constructed in accordance with the present invention not only tolerates an extraordinary degree of tilting, but more importantly the rigid connection between the vacuum cleaner tubular extension 68 and platform 10 allows manual control of any tilting tendency, either fore and aft or laterally, by providing a substantial lever arm enabling application of manual pressure to either resist or correct inclination of the supported load. In practice, it has been found that such appliances are easily stabilized during movement by exerting manual pressure on the upper end of the tubular extension with one hand, while exerting a counteracting manual pressure directly against an upper corner portion of the appliance with the other hand.

While the invention has been shown and described in a single embodiment and with respect to application to a specific appliance, it will be apparent that changes and modifications may be made therein and that utility thereof is in no sense restricted to such specific appliance, it being equally suitable for a variety of industrial applications and other transport problems. It is, therefore, to be understood that it is not intended to limit the invention to the embodiment or application shown, but only by the scope of the claims which follow.

We claim:

1. A load supporting and transporting device comprising a shallow rigid tray having an upwardly displaced flat center portion, a circular plate secured to said center portion in downwardly spaced relation therefrom, an annular flexible diaphragm bonded at its inner periphery to said plate and at its outer periphery to the lower surface of said tray to form an inflatable annular cavity, a duct connected to said tray in overlapping relation with said center portion including a cylindrical neck portion rigid with respect to said tray and extending outwardly and upwardly therefrom, means forming registered openings in said duct and said tray providing communication between said duct and said annular cavity, means forming a plurality of openings in said plate for venting said cavity into the space beneath said diaphragm, and a rigid pressurized air conducting tube telescopingly engaging said neck portion.

2. The structure set forth in claim 1 wherein the lower surface of said plate is substantially flush with the lower surface of said tray.

3. The structure set forth in claim 2 wherein said tray is square in plan form and said diaphragm peripheries define concentric circles, the circle defining the outer periphery having a diameter substantially equal to the side dimension of the tray.

4. A load supporting and transporting device comprising a shallow rigid tray, a duct having a first portion connected to and extending substantially inwardly toward the center portion of said tray and including an outwardly and upwardly inclined cylindrical neck portion rigid with respect to said tray and external of the tray, a rigid pressurized air conducting tube telescopingly and rigidly engaging said neck portion, an annular flexible diaphragm connected in peripherally sealed relation to said tray to form an inflatable annular cavity, means forming an opening in said tray providing communication between said first portion of said duct and said annular cavity, means formed near the inner periphery of said diaphragm for venting said cavity into the space beneath said diaphragm, and means fixedly securing the inner periphery of said diaphragm to the center portion of said tray.

5. A lifting and transporting attachment for a vacuum cleaner of the type having a pressure outlet connectable to a flexible hose, said attachment comprising a shallow rigid tray, duct means rigidly secured to said tray having an inner portion extending substantially inboard of the periphery of said tray and having a portion extending outwardly and upwardly with respect to said tray, a rigid elongated tube connectable at one end to said hose and detachably rigidly connected at the other end to said duct means to form a unitary rigid assembly with said tray, an annular flexible diaphragm bonded at its outer periphery to said tray, means fixedly securing the inner periphery of said diaphragm to the center portion of said tray whereby an annular cavity is formed between said diaphragm and said tray, passage means in said tray connecting said annular cavity in communicating relation with said inner portion of said duct means, and means formed near the inner periphery of said diaphragm for venting said cavity into the space beneath said diaphragm.

References Cited by the Examiner

UNITED STATES PATENTS

| | | |
|---|---|---|
| 2,780,826 | 2/1957 | Coons et al. |
| 2,862,220 | 12/1958 | Orr _____ 280—47.34 X |
| 3,052,483 | 9/1962 | Petersen _____ 180—7 |
| 3,055,446 | 9/1962 | Vaughen _____ 180—7 |
| 3,082,836 | 3/1963 | Billman _____ 180—7 |
| 3,097,718 | 7/1963 | Jay et al. _____ 180—7 |

FOREIGN PATENTS

| | | |
|---|---|---|
| 878,818 | 10/1961 | Great Britain. |
| 924,834 | 5/1963 | Great Britain. |

A. HARRY LEVY, *Primary Examiner.*